US005662833A

United States Patent [19]

Laakso et al.

[11] Patent Number: 5,662,833
[45] Date of Patent: Sep. 2, 1997

[54] ELECTRICALLY CONDUCTING THERMOSET POLYMER COMPOSITIONS WITH HYDROXY CONTAINING PROTONIC ACID DOPANT

[75] Inventors: Jukka Laakso, Helsinki; Jan-Erik Österholm, Porvoo; Hannele Järvinen, Vantaa, all of Finland

[73] Assignee: Neste Oy, Espoo, Finland

[21] Appl. No.: 562,245

[22] Filed: Nov. 22, 1995

Related U.S. Application Data

[63] Continuation of Ser. No. 266,355, Jul. 1, 1994, abandoned.

[51] Int. Cl.⁶ .................... H01B 1/12; C08L 61/10; C08L 63/00; C08L 61/28
[52] U.S. Cl. .................... 252/500; 525/437; 525/504; 525/509
[58] Field of Search .................... 252/500, 518, 252/519, 520, 521; 525/437, 504, 509

[56] References Cited

U.S. PATENT DOCUMENTS

| | | | |
|---|---|---|---|
| 3,476,706 | 11/1969 | Bornstein | 525/503 X |
| 3,848,044 | 11/1974 | Hagiwara et al. | 525/503 X |
| 3,954,690 | 5/1976 | Hesse et al. | 527/602 |
| 3,963,498 | 6/1976 | Trevoy | 428/411 X |
| 4,025,463 | 5/1977 | Trevoy | 252/500 |
| 4,983,322 | 1/1991 | Elsenbaumer | 252/500 |
| 5,061,294 | 10/1991 | Harmer et al. | 252/500 X |
| 5,069,820 | 12/1991 | Jen et al. | 252/500 |
| 5,160,457 | 11/1992 | Elsenbaumer | 252/500 |
| 5,171,478 | 12/1992 | Han | 252/500 |
| 5,232,631 | 8/1993 | Cao et al. | 252/500 |
| 5,281,363 | 1/1994 | Shacklette et al. | 252/500 |
| 5,422,423 | 6/1995 | Shacklette et al. | 252/500 X |
| 5,532,025 | 7/1996 | Kinlen et al. | 252/500 X |
| 5,552,216 | 9/1996 | Sugimoto et al. | 252/500 X |

FOREIGN PATENT DOCUMENTS

| | | |
|---|---|---|
| 0582919 | 2/1994 | European Pat. Off. . |
| 47-018661 | 5/1972 | Japan . |
| 60-130628 | 7/1985 | Japan . |
| 63-216267 | 9/1988 | Japan . |
| 9314166 | 7/1993 | WIPO . |
| 93/24554 | 12/1993 | WIPO . |

*Primary Examiner*—Douglas J. McGinty
*Attorney, Agent, or Firm*—Birch, Stewart, Kolasch & Birch, LLP

[57] ABSTRACT

The present invention relates to electrically conducting thermoset compositions and methods for preparing them. In the compositions according to the invention, the conducting component is a polyaniline protonated with a protonic acid containing at least one hydroxyl group. The thermoset matrix can be, for instance, a phenol-formaldehyde resin, a melamine-formaldehyde resin, or a polyester resin.

24 Claims, No Drawings

ELECTRICALLY CONDUCTING THERMOSET POLYMER COMPOSITIONS WITH HYDROXY CONTAINING PROTONIC ACID DOPANT

This application is a continuation of application Ser. No. 08/266,355 filed on Jul. 1, 1994, now abandoned.

BACKGROUND OF THE INVENTION

1. Field of the Invention

The present invention relates to electrically conducting polymer mixtures and methods of preparing them, particularly to electrically conducting polymer mixtures which are mixtures of a matrix polymer and an electrically conductive polymer. More particularly, the present invention relates to electrically conductive polymer mixtures where the matrix polymer is a thermoset and the conducting polymer is protonated polyaniline.

2. Description of the Related Art

Electrically conductive polymers are at present subject to great interest in different parts of the world. These polymers can be used for replacing metal conductors and semiconductors in a number of applications, such as batteries, sensors, switches, light cells, circuit boards, heating elements, electrostatic discharge elimination (ESD), and electromagnetic interference shielding (EMI). The advantages of conductive polymers over metals include their light weight, mechanical properties, corrosion resistance, and less expensive synthesis and processing methods.

Electrically conducting polymer compositions are of increasing practical interest, for instance, in packaging of electronic instruments and parts, and in solving a wide range of static discharge, electrostatic dissipation and electromagnetic shielding problems.

Electrically conductive plastics can be divided roughly into two categories: filled conductive plastics, in which a conductive filler, such as carbon black or soot, carbon fiber, metal powder, etc., is added to a thermosetting or thermoplastic resin, and intrinsically conductive plastics, which are based on polymers which have been rendered electrically conductive by oxidation, reduction or protonation (doping).

Often, the filled conductive plastics are made by mixing solid conductive particles, such as carbon black, stainless steel fibers, silver or aluminum flakes, or nickel-coated glass fibers, with an insulating plastic material. The plastic material can be either a thermoplastic material, e.g., polystyrene, polyolefin, nylons, polycarbonate, acrylonitrile-butadiene-styrene co-polymers (ABS), and the like or a thermoset, e.g., polyesters or phenolic resins.

The electrical conductivity of filled conductive polymers is dependent on mutual contacts between the conductive filler particles. Usually a well dispersed filler is needed in amounts of approximately 10–50 wt. % to produce composites having a good conductance. However, such conductive composites involve problems: their mechanical and certain of their chemical properties are crucially impaired as the filler content increases and the polymer content decreases; their conductivity is difficult to control, especially within the semiconductor range; and stable and homogenous dispersing of the filler into the matrix plastic is difficult.

Major problems related to these so-called "filled" electrically conducting plastic compositions include difficulties in processing techniques, and the often poor mechanical properties, such as brittleness and reduced elongation at break, of the final products. Also problems with colorability and poor adjustability of conducting properties are characteristic of filled electrically conducting plastic materials.

More recently, there has been increased interest in replacing the above-mentioned carbon black or metal particle-filled compounds with intrinsically electrically conductive polymers, and compositions thereof with common insulating polymers. Intrinsically conductive plastics can be prepared from organic polymers containing long conjugated chains formed by double bonds and heteroatoms. The polymers can be rendered conductive by modifying the π- and π-p-electron systems in their double bonds and heteroatoms by adding to the polymer certain blending or doping agents which will serve as electron receptors or electron donors in the polymer. Thereby electron holes or extra electrons are formed in the polymer chain, enabling electric current to travel along the conjugated chain.

An advantage of the intrinsically conductive plastics is the ease of varying their conductivity as a function of the amount of the doping agent, i.e. the degree of doping, especially within low conductivity ranges. On the other hand, achieving low conductivities with filled conductive plastics is difficult. Examples of currently known intrinsically conductive polymers include polyacetylene, poly-p-phenylene, polypyrrole, polythiophene and its derivatives, and polyaniline and its derivatives.

Among the various conductive polymers, polyanilines in particular have attracted special attention because of their excellent environmental stability and their low production costs.

Polyaniline is well known in the art, and its synthesis and the preparation of its electrically conductive form by, for example, protonating it to the "doped" form by using strong protonic acids, has been disclosed. Typical examples of protonic acids used in the protonation of polyaniline are HCl, $H_2SO_4$, sulfonic acids, phosphoric acids, etc. See, for instance, U.S. Pat. Nos. 5,069,820; 5,232,631; and 5,160,457; each of which are hereby incorporated by reference.

Polyaniline, with its derivatives, is in particular a technically and commercially promising intrinsically conductive polymer. An aniline polymer or a derivative thereof is made up of aniline monomers or derivatives thereof, the nitrogen atom of which is bonded to the paracarbon of the benzene ring of the subsequent unit. Unsubstituted polyaniline may appear in a number of forms, including leucoemeraldine, protoemeraldine, emeraldine, nigraline, and toluprotoemeraldine forms. For conductive polymer applications, the emeraldine form is generally used, having the formula

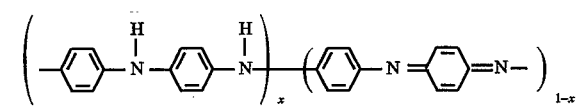

wherein X is approximately 0.5.

According to state-of-the-art technology, the doping of polyaniline is usually carried out by using protonic acids, which include HCl, $H_2SO_4$, $HNO_3$, $HClO_4$, $HBF_4$, $HPF_6$, HF, phosphoric acids, sulfonic acids, picrinic acid, n-nitrobenzoic acid, dichloroacetic acid, and polymer acids.

Preferably the prior art doping is carried out using sulfonic acid or its derivatives, such as dodecylbenzenesulfonic acid (DBSA). The protonization is focused on the iminic nitrogen atoms in the aniline units according to the formula presented above, which comprise approximately 50% of the N atoms of polyaniline. Examples of publications in the field include U.S. Pat. Nos. 3,963,498, 4,025,463, and 4,983,322, which are hereby incorporated by reference. The doping of polyaniline with protonic acids is also widely discussed in the literature in the field. U.S. Pat. No. 5,171,478, which is hereby incorporated by reference, discloses a method for increasing the molar mass of polyaniline by heating the polyaniline until its viscosity has increased.

Polyanilines have been blended successfully with thermoplastic polymers. Several patent publications describe electrically conducting thermoplastic polymer compounds and blends which can be solution and melt-processed. See, for instance, U.S. Pat. No. 5,232,631 and EP 582,919, which are hereby incorporated by reference. U.S. Pat. No. 5,232,631 discloses processible polyaniline compositions and blends that exhibit much lower percolation thresholds, sometimes even below 1% w/w, of conductive polyaniline. The patent relates to conductive polymers and particularly to the use of functionalized protonic acids to induce processibility of electrically conductive polyanilines, and to induce solubility of electrically conductive polyanilines in organic liquids or fluid (melt) phases of solid thermoplastic polymers.

According to the prior art, electrically conducting thermosets contain carbon black, metal fibers, flakes, etc. These kinds of filled conducting compositions have, however, the above-mentioned defects due to, for instance, impaired mechanical properties.

Patent publication WO 93/14166, which is incorporated herein by reference, discloses an anticorrosive paint comprising a binder and one or more neutral or electrically conductive conjugated homopolymers or copolymers, such as doped polyaniline. As examples of thermoset resin binders, unsaturated polyester resins and phenolic resins can be used. Binders and conductive polymers have been dispersed in liquid medium, such as water or organic hydrocarbons to form dispersions. In such dispersions, it is not possible to guarantee uniform or steady conductivity. In paints prepared according to this publication, no uniform "cross-linked net-works" are formed by doped polyaniline.

SUMMARY OF THE INVENTION

To avoid the problems connected with filled thermoset compositions mentioned above, and to avoid problems related to the use of typical solvents such as, for instance, aliphatic and aromatic hydrocarbon solvents, the main object of the present invention is to provide a homogeneous, uniform, electrically conducting thermoset composition containing protonated polyaniline as a conductive component without using any additional solvent.

Another object of the present invention is to provide an electrically conducting thermoset composition having improved processing properties as compared to the compositions of the prior art.

Still a further object of the invention is to provide an electrically conducting thermoset composition which can be colored.

These and other objects and advantages are surprisingly attained by the present invention, which is directed to electrically conducting, homogeneous and uniform, processible thermoset compositions in which the conductive component is protonated polyaniline which dissolves in the thermoset resins without the need for additive solvents. The present invention is also directed to a method of producing these electrically conductive thermoset mixtures.

More specifically, the present invention is directed to an electrically conducting thermoset composition comprising:

(a) a conjugated polymer selected from the group consisting of polyaniline, substituted polyanilines, and copolymers thereof;

(b) a protonic acid having at least one hydroxyl group, and capable of forming a complex with, and imparting electrical conductivity and solubility to, said conjugated polymer (a); and (c) a thermoset resin.

The present invention is also directed to a method for producing the above electrically conducting thermoset composition, comprising:

(a) dissolving a polyaniline protonated with a hydroxyl group-containing protonic acid in a thermoset resin-forming system to obtain a mixture, and (b) curing said mixture.

This method may further comprise:

(c) adding color pigments to said mixture, and/or (d) adding curing agents and/or curing accelerators to said mixture.

Further scope of applicability of the present invention will become apparent from the detailed description given hereinafter. However, it should be understood that the detailed description and specific examples, while indicating preferred embodiments of the invention, are given by way of illustration only, since minor changes and modifications within the spirit and scope of the invention will become apparent to those skilled in the art from this detailed description.

DETAILED DESCRIPTION OF THE INVENTION

The thermosets used in the present invention are not particularly limited. Particular thermosets may be formaldehyde-containing resins or polyester resins. More particularly, the formaldehyde-containing resins may be phenol-formaldehyde or melamine-formaldehyde polymers, but other formaldehyde-containing resins may also be used. These kinds of polymers are used widely, for instance, as coatings and laminates, in the paint industry, and in the automobile industry. Various processing techniques are commonly used with these thermosets, for example, applying and laminating processes, and compression and transfer molding processes.

Phenol-formaldehyde resins can be either resole resins or novolac resins. Resole resins are prepared using an alkaline catalyst and a molar excess of formaldehyde. Novolac resins, on the other hand, are prepared using an acid catalyst and less than one mole of formaldehyde per mole of phenol. Resoles and resolated novolacs are inherently thermosets and do not require any curing agent for curing, but only heat. However, the curing time can be significantly decreased by using suitable curing agents. Novolacs, by comparison, are thermoplastic and require the addition of a curing agent to become thermosets, the most common being either hexamethylenetetramine or a resole.

A wide variety of polyester-condensation polymers are made commercially. Space-network thermosets can be prepared through the reaction of polybasic acid anhydrides with polyhydric alcohols. After this first stage of the reaction, an esterification of the primary hydroxyl groups is carried out. In the next stage in the formation of the resin, direct esterification occurs slowly, particularly at the secondary hydroxyls.

Melamine resins are based on the condensation of formaldehyde with an amino compound, 2,4,6-triamino-1,3,5-triazine.

According to the present invention, it is now possible to convert these thermosets into electrically conductive materials without impairing their mechanical properties. This is possible by using as a conductive component polyaniline which is protonated with a protonic acid containing at least one hydroxyl group. The protonating acid can be a straight-chain hydroxyl group containing acid or a phenolic acid. Suitable acids include sulphonic, phosphoric and phosphonic acids. When the acid contains a phenolic structure, the hydroxyl group is preferably in the para position in relation to the acid substituent. The protonating acids are preferably phenol structure-containing sulphonic, phosphoric or phosphonic acids, or straight-chain hydroxyl group containing sulphonic acids. The acid is most preferably phenol-4-sulphonic acid.

Protonating the polyaniline with the above-described hydroxyl group containing acids results in good solubility in the thermoset. Thus, there is no need for additional solvents or co-solvents. The protonating acid also stays in the matrix, due to effective cross-linking. The polyaniline is desirably doped with protonic acid in an amount of 0.3 to 0.5 moles of protonic acid per mole of aniline monomer.

If the polyaniline is protonated with an acid not containing at least one hydroxyl group, for instance, with camphor sulphonic acid, additional solvents must be added to the complex to obtain improved solubility. Nevertheless, the obtained conductivity in the thermoset composition is not uniform. Also, the processibility of the composition is quite poor. Results are still much worse if the protonating acid is, for instance, dodecylbenzene-sulphonic acid (DBSA), which is successfully used as a protonating acid for polyaniline in thermoplastic compositions.

The polyaniline used in the electrically conducting thermoset compositions according to the present invention is synthesized and protonated by methods known in the art. More particularly, polyaniline in the emeraldine form is used. In this process, the protonating acid which, according to the invention, must contain a hydroxyl group, and which is most preferably a phenol-4-sulphonic acid, and aniline are added to water. Subsequently, ammonium persulphate is added. After polymerization, the reaction mixture is filtered and washed with water and ethanol. In Example 1, the polymerization process of polyaniline is described in more detail. It should be noted that protonation of polyaniline is preferably carried out during the polymerization process, so that there is no need for further de-doping and re-doping of the polyaniline.

With an acid containing a phenol moiety or a straight-chain hydroxyl group, and preferably with a phenol-4-sulphonic acid, protonated polyaniline acts in the thermoset composition not only as a conductive component, but also as a curing agent. This is possible because the doped polyaniline complex contains excess protonating acid sufficient to act as a curing agent for the thermoset composition. By an additional increase in the amount of the protonating acid in the polymer composition, the curing takes place more rapidly and the solubility of the protonated polyaniline complex in the thermoset resin increases further. Other curing agents that may be used include other sulphonic acids, such as toluene sulphonic acid, benzene sulphonic acid, xylene sulphonic acid or ethyl benzene sulphonic acid. The curing temperature is usually about 70° to 90° C., preferably about 80° C. for phenol- and melamine-formaldehyde resins. For polyester, curing takes place at room temperature, but can be accelerated if the temperature is raised to 60° C. Typical curing agents are peroxides.

The amount of the protonated polyaniline in the thermoset composition of this invention can vary widely. In most applications, the amount of the protonated polyaniline in the thermoset composition is from 0.1 to 30% by weight, preferably about 1 to 20% by weight, and most preferably about 5 to 25% by weight of the composition. Conductivities of at least about $10^{-2}$ to $10^{-6}$ S/cm can be achieved with a doped polyaniline content of about 10 to 7% by weight.

A typical composition for a plastics mixture suitable for low level ESD applications is, for example, a mixture which contains the conductive polymer complex in an amount of approximately 0.1 to 1.5 wt. % and matrix polymer in an amount of approximately 98.5 to 99.9 wt. %, said composition having a conductivity of about $10^{-11}$ to $10^{-8}$ S/cm.

Another typical composition for a plastics mixture suitable for high-level ESD application is, for example, a mixture which contains conductive polymer complex in an amount of approximately 1 to 5 wt. % and matrix polymer in an amount of approximately 95 to 99 wt. %. Such a plastics mixture has a conductivity of about $10^{-8}$ to $10^{-6}$ S/cm.

Still another typical composition for a plastics mixture suitable for EMI applications is, for example, a mixture which contains conductive polymer complex in an amount of approximately 5 to 20 wt. % and matrix polymer in an amount of approximately 80 to 95 wt. %, said composition having a conductivity of greater than $10^{-3}$ S/cm.

Cured thermoset compositions according to this invention are homogeneous and uniform. When cured as thin layers, the thermosets are transparent. Compositions according to the invention can also contain different coloring agents in order to obtain colored products. This is a remarkable advantage compared to products containing carbon black as a conductive material.

In the following examples, the invention is described in more detail. However, these examples are not to be construed as limiting the invention in any way.

EXAMPLE 1

Phenol-4-sulphonic acid protonated polyaniline in the emeraldine form was synthesized as follows: 54.3 ml of phenol-4-sulphonic acid (FLUKA 77670) and 20.2 ml of aniline were added to 412 ml of water. To this solution 58.0 g of ammonium persulphate in 100 ml of $H_2O$ was added dropwise over 4 hours. The temperature was 4° C. After the polymerization, the reaction mixture was filtered and washed several times with water and ethanol. The polymer was dried in a vacuum at 60° C. The conductivity of a pressed pellet made therefrom was about 1 S/cm.

EXAMPLE 2

10 wt. % of the complex synthesized according to Example 1 was mixed with phenolformaldehyde resole resin (90 wt. %) (Resol, Priphen 15000, a product of Neste Resins Oy). The complex was dissolved in the resin after a few minutes. A thin layer of this resin was spread on a substrate and heat treated at 80° C. for 10 to 15 min. The conductivity of this cured resin was $10^{-2}$ S/cm. The cured thin layer was uniform and homogeneous, and was transparent green in color.

EXAMPLE 3

The same procedure was followed as in Example 2, but 7.5 wt. % of the conducting complex was added. The conductivity of the cured resin was $1.3*10^{-6}$ S/cm. A thin layer of the cured resin was homogeneous, uniform, and transparent green in color.

EXAMPLE 4

The same procedure was followed as in Example 2, but toluene sulphonic acid, benzene sulphonic acid, xylene sulphonic acid, ethylbenzene sulphonic acid or phenol-4-sulphonic acid were added in amounts of 1 to 10 wt. % as catalysts to activate the curing. The curing time varied between 3 and 15 min at 80° C. This layers of these cured resins were homogeneous and transparent green in color.

EXAMPLE 5

The same procedure was followed as in Example 2 but different color pigments were added. PALIOTOL® Yellow pigment gave a green film, HELIOGEN® Blue pigment gave a blue film and ECOPAQUE 12302 pigment gave a brown film. All samples also contained $TiO_2$. The cured films attained were homogeneous and uniform.

EXAMPLE 6

(Comparative Example)

The same procedure was followed as in Examples 1 and 2, but toluene-4-sulphonic acid was used as a dopant. The conductivity of this cured resin was only $10^{-6}$ S/cm. The solubility and processibility of the complex was poor.

EXAMPLE 7

10 wt. % of the composition prepared in Example 1 was added to 90 wt. % of a polyester resin (manufactured by Neste Oy). The complex dissolved in the resin. 1.5 wt. % of methyl-ethylketone peroxide and 1.5 wt. % of Co-catalyst were added. The condugtivity of the cured, homogeneous and transparent resin was $10^{-6}$ S/cm.

EXAMPLE 8

90 wt. % of melamine-formaldehyde resin (Melurex 5450, produced by Neste Resins Oy) was added to 10 wt. % of a phenol-4-sulphonic acid protonated polyaniline. 4 wt. % of the same acid was further added as a catalyst. The mixture was spread on a glass plate as a 20 µm thick layer and cured at 75° C. for 10 min. The conductivity of cured film was $10^{-5}$ S/cm. The obtained film was uniform and transparent.

EXAMPLE 9

(Comparative Example)

Emeraldine base polyaniline and camphor sulphonic acid (1:0.5 mol/mol) were mixed in mortar. The obtained complex was mixed with m-cresol in room temperature. Formaldehyde-water 37% solution was added to the mixture, so that the amount of the complex was 10 wt. % in the final resin composition, and mixed in room temperature. Water promotes the solubility of the complex in m-cresol. The ratio of m-cresol to formaldehyde was 1:0.8 mol/mol. p-Toluenesulphonic acid was added in an amount of 5 wt. % as a curing agent. The resin was cured at 70° C. The conductivity of the cured resin was $10^{-7}$ to $10^{-6}$ S/cm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electrically conducting thermoset polymer composition comprising:

(1) a thermoset resin that is (a) at least partially curable by a protonic acid containing at least one hydroxy group; and (b) a member selected from the group consisting of a phenol formaldehyde resin, a melamine formaldehyde resin, and a polyester resin; and (2) a conductive polymer complex which is completely or partially soluble in said thermoset resin, and which is capable of at least partially curing said thermoset resin, which comprises:

(a) a conjugated polymer, selected from the group consisting of polyaniline, substituted polyanilines, and co-polymers thereof; and (b) a protonic acid having at least one hydroxyl group, and capable of forming a complex with, and imparting electrical conductivity and solubility to, said conjugated polymer.

2. A method for producing an electrically conducting thermoset polymer composition comprising:

(1) a thermoset resin that is (a) at least partially curable by a protonic acid containing at least one hydroxy group; and (b) a member selected from the group consisting of a phenol formaldehyde resin, a melamine formaldehyde resin, and a polyester resin; and (2) a conductive polymer complex which is completely or partially soluble in said thermoset resin, and which is capable of at least partially curing said thermoset resin, and which comprises:

(a) a conjugated polymer, selected from the group consisting of polyaniline, substituted polyanilines, and co-polymers thereof; and (b) a protonic acid having at least one hydroxyl group, and capable of forming a complex with, and imparting electrical conductivity and solubility to, said conjugated polymer, and wherein said method comprises the steps of:

(A) dissolving the conductive polymer complex (2) in said thermoset resin (1) to obtain a mixture; and (B) curing said mixture to form an electrically conducting thermoset polymer composition.

3. The electrically conducting thermoset polymer composition according to claim 1, wherein the protonic acid is a sulfonic acid, a phosphoric acid, or a phosphonic acid, containing at least one phenyl group.

4. The electrically conducting thermoset polymer composition according to claim 3, wherein the protonic acid contains a phenol moiety.

5. The electrically conducting thermoset polymer composition according to claim 4, wherein the protonic acid is a phenol-4-sulphonic acid.

6. The electrically conducting thermoset polymer composition according to claim 1, wherein the polyaniline has been protonated with the protonic acid during the polymerization of aniline.

7. The electrically conducting thermoset polymer composition according to claim 1, wherein the electrically conductive polyaniline in the thermoset composition is present in an amount of about 0.1 to 30% by weight of the total composition.

8. The electrically conducting thermoset polymer composition according to claim 7, wherein the electrically conductive polyaniline in the thermoset composition is present in an amount of about 1 to 20% by weight of the total composition.

9. The electrically conducting thermoset polymer composition according to claim 8, wherein the electrically conductive polyaniline in the thermoset composition is present in an amount of about 5 to 15% by weight of the total composition.

10. The electrically conducting thermoset polymer composition according to claim 1, further comprising coloring agents suitable for attaining colored products.

11. The electrically conducting thermoset polymer composition according to claim 1, further comprising a curing agent, a curing accelerator, or both.

12. The electrically conducting thermoset polymer composition according to claim 1, wherein the composition is transparent.

13. The electrically conducting thermoset polymer composition according to claim 1, wherein said composition has a conductivity of less than $10^{-3}$ S/cm.

14. The electrically conducting thermoset polymer composition according to claim 13, wherein said composition has a conductivity of less than $10^{-6}$ S/cm.

15. The electrically conducting thermoset polymer composition according to claim 14, wherein said composition has a conductivity of less than $10^{-9}$ S/cm.

16. The method for producing an electrically conducting thermoset polymer composition according to claim 2, wherein the amount of conductive polyaniline is 0.1–30% by weight based on the total composition.

17. The method for producing an electrically conducting thermoset polymer composition according to claim 16, wherein the amount of conductive polyaniline is 1 to 20% by weight based on the total composition.

18. The method for producing an electrically conducting thermoset polymer composition according to claim 17, wherein the amount of conductive polyaniline is 5 to 15% by weight based on the total composition.

19. The method for producing an electrically conducting thermoset polymer composition according to claim 2, wherein the polyaniline has been protonated during polymerization of aniline.

20. The method for producing an electrically conducting thermoset polymer composition according to claim 2, wherein the polyaniline has been protonated with a sulphonic acid, a phosphoric acid, or a phosphonic acid containing at least one hydroxyl group.

21. The method for producing an electrically conducting thermoset polymer composition according to claim 2, wherein the polyaniline has been protonated with a protonic acid containing a phenol structure.

22. The method for producing an electrically conducting thermoset polymer composition according to claim 21, wherein the polyaniline is protonated with a phenol-4-sulphonic acid.

23. The method for producing an electrically conducting thermoset polymer composition according to claim 2, further comprising (c) adding color pigments to the mixture.

24. The method for producing an electrically conducting thermoset polymer composition according to claim 2, further comprising (d) adding a curing agent, a curing accelerator, or both, to the mixture.

* * * * *